June 15, 1926.

C. W. CHISHOLM

ROLLER BEARING

Filed Jan. 5, 1923

INVENTOR.
Charles W. Chisholm
BY William A. Hardy
his ATTORNEY.

June 15, 1926.

C. W. CHISHOLM

ROLLER BEARING

Filed Jan. 5, 1923

INVENTOR.
Charles W. Chisholm
BY William A. Hardy
his ATTORNEY.

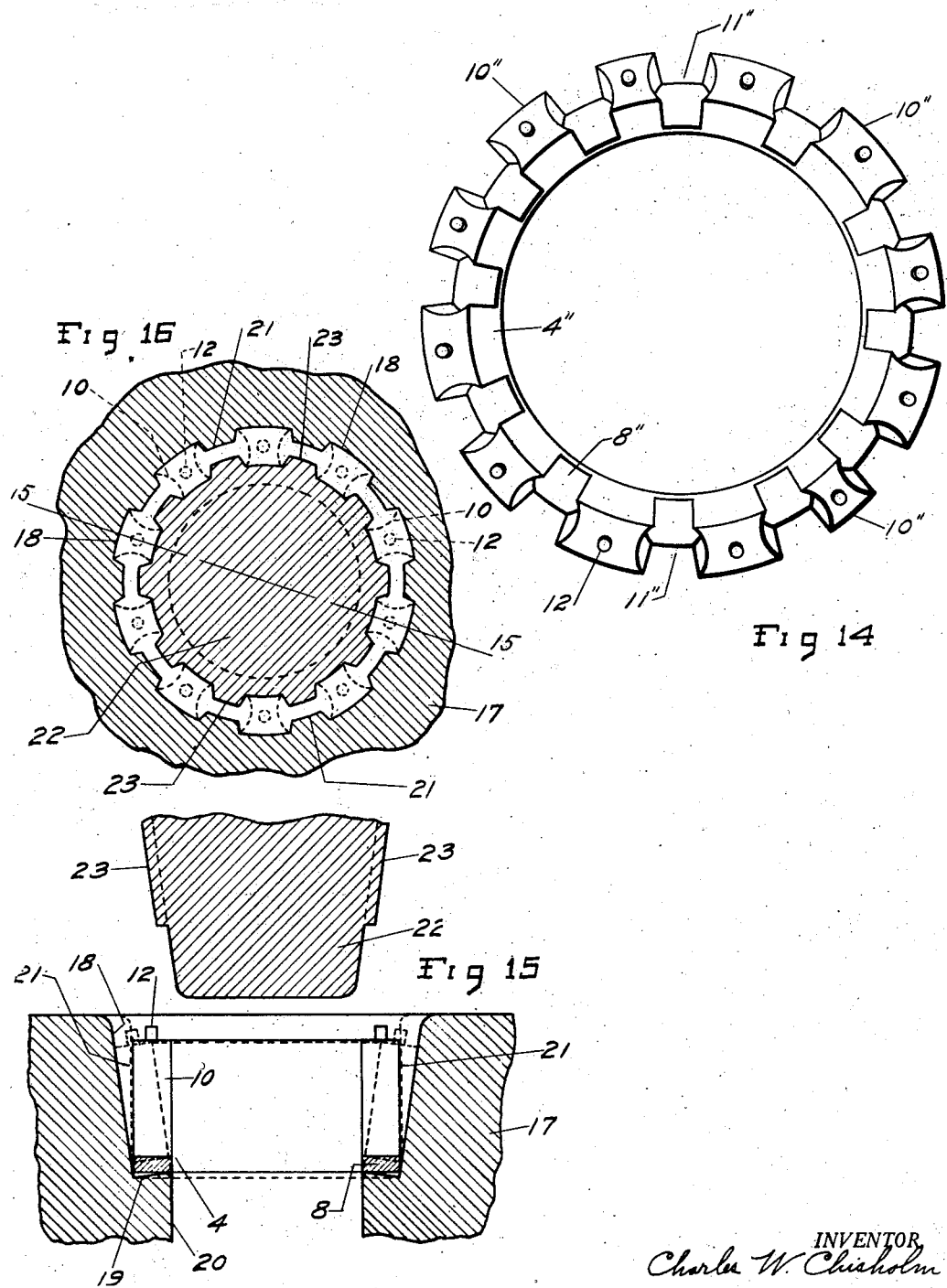

Patented June 15, 1926.

1,588,446

UNITED STATES PATENT OFFICE.

CHARLES W. CHISHOLM, OF EAST ORANGE, NEW JERSEY, ASSIGNOR TO ORANGE BEARING COMPANY, OF ORANGE, NEW JERSEY, A CORPORATION OF NEW JERSEY.

ROLLER BEARING.

Application filed January 5, 1923. Serial No. 610,762.

My invention relates to roller bearings and while particularly directed to tapered roller bearings, some of the features of the invention are also applicable to other types of roller bearings.

The principal object of my invention is to provide an improved cage especially designed for tapered roller bearings, although some features thereof are also applicable to cages for other types of roller bearings. My co-pending application Serial No. 105,946, filed May 1, 1926 and entitled Production of cages for roller bearings, is a division of the present application and describes and claims an improved method and an improved apparatus for producing cages of the type herein described.

Another object of my invention is to provide in a tapered roller bearing an improved arrangement preventing the formation of ridges or grooves on the bearing surface of the outer conical raceway or cup which would interfere with such adjustments of the bearing as are necessary to take up or compensate for wear or looseness.

A further object of my invention is to provide an improved construction and arrangement for roller bearings of the type wherein a plurality of rollers are maintained in proper position by means of a cage, whereby substantially all vibration in the bearing and chattering of the rollers are eliminated, and whereby the parts will wear uniformly, so that the bearing will run very smoothly and the friction noise and wear resulting from the operation thereof will be reduced to a minimum.

Other objects and features of my invention will be hereinafter more fully described and claimed.

In order that my invention may be more clearly understood, attention is directed to the drawings accompanying and forming part of this specification and in which:—

Fig. 14 is a plan view of the body portion of still another form of cage which may be employed in place of the roller cage of the bearing shown in Figs. 1 and 2;

Fig. 15 is a sectional view, shown somewhat diagrammatically, of the apparatus which I prefer to employ for performing certain steps in my improved method of producing cages for tapered roller bearings of the type disclosed herein; and Fig. 16 is a sectional view taken at right angles to Fig. 15.

Figure 1:
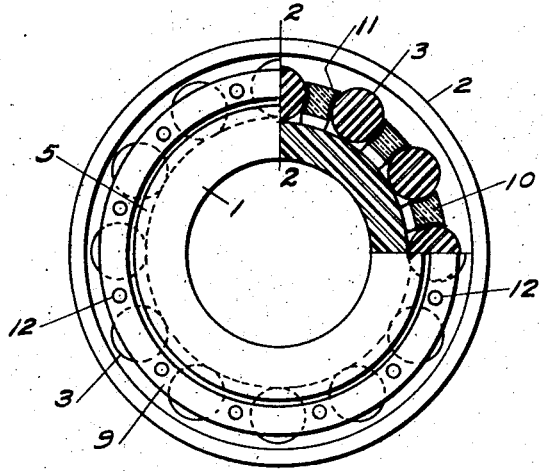
Figure 1 is a view in end elevation of one form of a roller bearing in accordance with my invention, a part of the bearing being shown in section on line 1—1 of Fig. 2.
Figure 2:
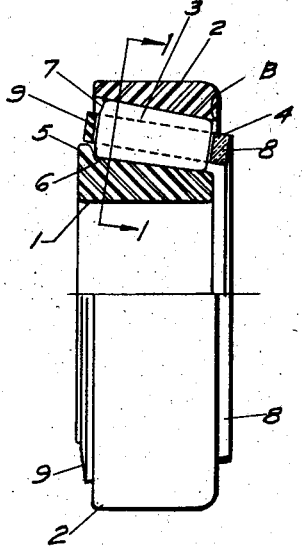
Fig. 2 is a view in side elevation of the bearing shown in Fig. 1, a part of the bearing being shown in section on line 2—2 of Fig. 1.

Referring to the drawing and especially to Figs. 1 and 2, the tapered roller bearing shown therein comprises an inner annular bearing member or cone 1, an outer bearing member or cup 2 having a conical bearing surface, an annular series of conical rollers 3 interposed between the cone 1 and cup 2 and a conical cage 4 in which the rollers 3 are mounted and which maintains the latter properly aligned and spaced about the axis of the bearing. The cone 1 is provided at its outer or larger end with an annular enlargement or flange 5. The inner face or shoulder of the flange 5 is bevelled, and preferably a circumferential groove 6 is formed at the base of the shoulder in order to provide clearance for the grinding tool during the operation of grinding the conical roller surface of the cone. The outer portion of the larger end of each roller 3 is bevelled or chamfered as indicated at 7 and is adapted to bear against the bevelled face or shoulder of the flange 5 on cone 1 to assist in taking up end thrusts.

The bearing shown in Figs. 1 and 2, and this is also true of the bearings shown in the other figures, is of the three-unit type, that is, neither the cone 1 nor the cup 2 have the rollers 3 permanently assembled therewith, the rollers being carried by the cage 4 and the cage and rollers constituting a third unit of the bearing. Accordingly, my bearing is extremely simple to assemble and disassemble and may be readily taken apart for inspection and repair or replacement of parts. It is to be distinctly understood, however, that many of the features of my invention are equally applicable to the usual two-unit types of tapered roller bearings, some features thereof also being applicable to still other types of bearings.

Figure 13:
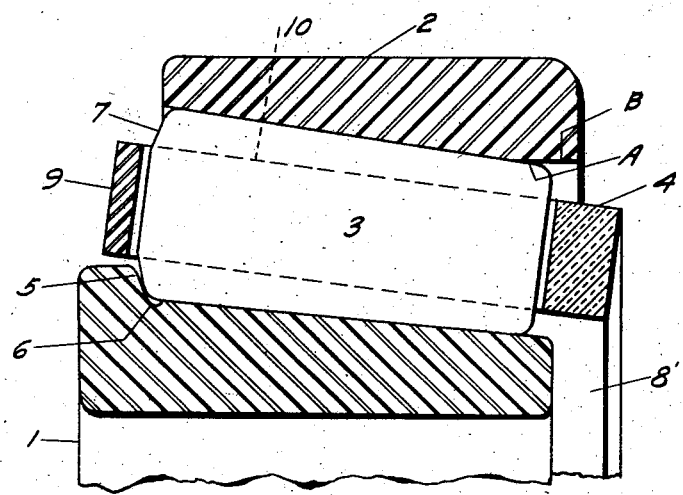
Fig. 13 is an enlarged fragmental, sectional view of the roller bearing shown in Figs. 1 and 2.
Figure 11:
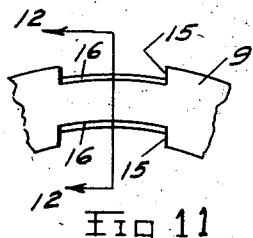
Fig. 11 is an enlarged fragmental plan view of the separate end ring of the cage shown in Figs. 8 and 9.
Figure 12:
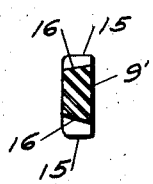
Fig. 12 is a sectional view taken on line 12—12 of Fig. 11.

The rollers 3 are preferably of such length that the conical bearing surfaces of the rollers at the smaller end portions of the latter extend beyond or overlap the smaller end of the conical bearing surface of the cup 2, that is, the end of said surface of the cup having the smaller diameter, as clearly indicated at "A" in Fig. 13. Accordingly, in the operation of the bearing, grooves or ridges will not be formed on the conical bearing surface of the cup 2 by the small ends of the rollers 3. This is an important feature for, in consequence, the cone 1, rollers 3 and cage 4 may be readily adjusted to the right, looking at Figs. 1 and 13, with respect to the cup 2 to take up or compensate for wear or looseness. The cup 2 is preferably formed between the smaller end of the conical bearing surface thereof and the adjacent end of the cup with an inner annular surface portion, preferably a cylindrical surface portion B, extending outwardly at an angle to said conical bearing surface, which is not engaged by the rollers 3, and which extends beyond or overlaps the corresponding ends of the rollers 3, the cone 1 and the cage 4. The construction described results in a bearing of compact arrangement and of neat appearance, and renders it difficult for dirt and other foreign matter to gain access to and accumulate on the raceways of the cone 1 and cup 2 or on the bearing surfaces of the rollers.

The cage 4, in the form of bearing shown in Figs. 1 and 2, comprises the two conical, inclined rings or annular end pieces 8 or 9 and an annular series of spaced bridges 10 connecting and secured to said rings, the spaces between said bridges constituting pockets 11 for the rollers 3. The end ring 8 and bridges 10 extending longitudinally therefrom, are integral, being preferably formed of a single bronze casting, and constitute the body portion of the cage; while the ring 9 is separate from such body portion but is rigidly secured thereto by reduced integral extensions on the free ends of the bridges 10 in the form of pins 12 which extend through holes 13 in the ring 9 and are upset at their ends into close clamping engagement with the walls of countersunk portions 13' of the holes. The opposing faces of adjacent bridges 10 are hollowed out or concaved, and each pair of the opposed edges of such bridges are spaced apart a distance less than the diameter of the rollers for which the cage is designed. Accordingly, the rollers are insertable into the sockets only from the ends thereof opposite the end ring 8. After the rollers are thus inserted in the sockets 11, the ring 9 is secured to the free ends of the bridges 10, as described. Therefore, while the rollers 3 are capable of rotating freely in their sockets, they will be securely held against lateral displacement from the cage. A cage of this construction is very rugged and strong and insures the rollers being maintained properly aligned and spaced in the bearing.

Figure 3:
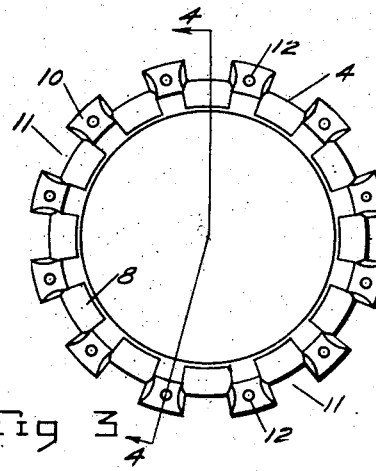
Fig. 3 is a plan view of the roller cage of the bearing shown in Figs. 1 and 2, before the separate end ring is applied thereto.

The cage 4', illustrated in Figs. 8 to 12, is quite similar to the cage 4 shown in Figs. 1 to 7, differing therefrom only in the manner in which the ring 9', corresponding to the ring 9 of the cage 4, is secured to the cast bronze body portion of the cage comprising the ring 8' and the bridges 10'. Instead of providing the bridges 10' at their free ends with reduced extensions in the form of pins as in the cage shown in Figs. 1 to 7, each of these bridges is provided at its free end and at the inner and outer edges thereof with a pair of spaced, substantially rectangular reduced projections 14. The ring 9', after the rollers 3 have been inserted or disposed in the sockets 11' of the cage, is seated against the ends of the bridges 10' between the extensions 14. This ring is provided in its opposite edge portions with rectangular notches 15 with which the projections 14 are respectively engaged. The bottom walls of the notches 15 are inclined or tapered as indicated at 16 and the projections 14 which closely fit said notches, are forced or spun towards each other into firm engagement with said walls. The projections 14 will, therefore, be in clamping engagement with the ring 9' and serve to rigidly secure or clamp the latter to the body portion of the cage, Where either of the cages heretofore described is employed in a bearing of the type shown in Figs. 1 and 2, the rollers 3 will be evenly spaced about the axis of the bearing because of the even spacing of the roller sockets of each of these cages about the axis of the cage. Moreover, if the bearing is provided with a cage having roller sockets arranged as shown in Fig. 3, each roller of the bearing and its socket will be diametrically opposite another roller and its socket. It is common practice to space and arrange the rollers as just described. The operation of bearings of the type disclosed herein usually results in considerable vibration of the parts and chattering of the rollers; and in the continued operation of such a bearing, it is generally found that the raceways of the inner and outer bearing members wear unevenly. I have discovered that these objectionable features, which are well recognized, are almost entirely due to the spacing and arrangement of the rollers in the manner above described. I have also discovered that the objectionable features referred to may be practically eliminated by spacing the rollers unevenly about the axis of the bearing and arranging the rollers so that no two are diametrically opposite. I preferably employ a roller cage having a body portion such as shown in Fig. 14 for holding the rollers so spaced and arranged. The construction of the cage 4″, shown in Fig. 14, is similar to that of the cage shown in Fig. 3, except that the bridges 10″ are of various widths and so arranged that the roller sockets 11″ are unevenly spaced about the axis of the cage with no two sockets diametrically opposite. Obviously, a roller cage of this construction may be employed in a bearing such as shown in Figs. 3, 4, 8 and 9. For reasons explained above, I consider it preferable where my improved bearing is to be used under certain conditions, to provide the same with a roller cage of the construction illustrated in Fig. 14 rather than with either of the other forms of roller cages disclosed and described herein.

Figure 4:
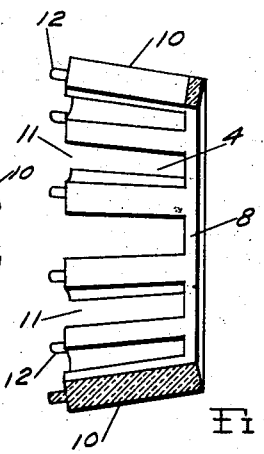
Fig. 4 is a sectional view taken on line 3—3 of Fig. 3.
Figure 5:
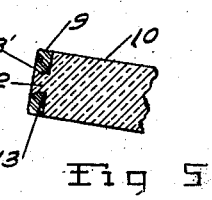
Fig. 5 is an enlarged fragmental, sectional view of the roller cage of the bearing shown in Figs. 1 and 2, illustrating the manner in which the separate end ring is secured to the cage.
Figure 6:
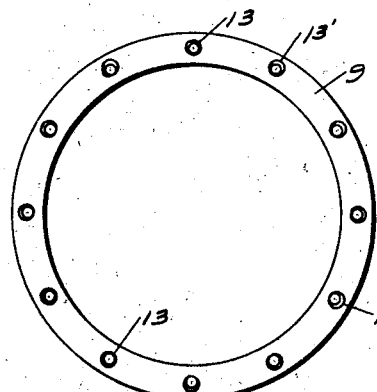
Fig. 6 is a plan view of the separate end ring for the cage of the bearing shown in Figs. 1 and 2.
Figure 7:
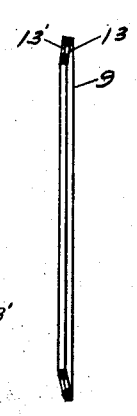
Fig. 7 is a central, sectional view of said ring.
Figure 8:
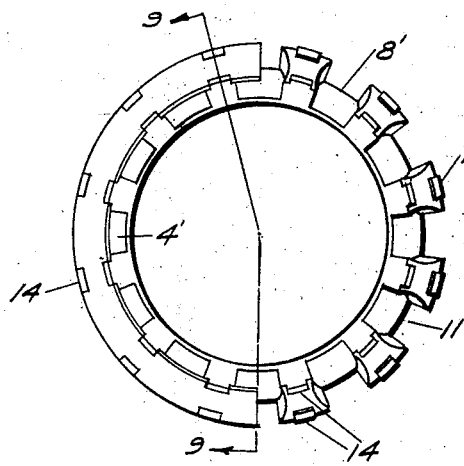
Fig. 8 is a plan view of a modified form of roller cage which may be used in place of the cage of the bearing shown in Figs. 1 and 2, the separate end ring of the cage being partly broken away.
Figures 9, 10:
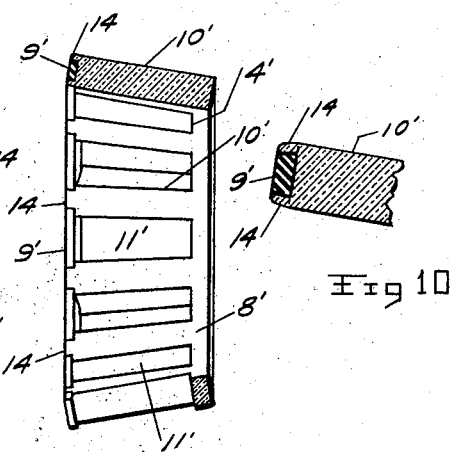
Fig. 9 is a sectional view taken on line 9—9 of Fig. 8.
Fig. 10 is an enlarged fragmental sectional view of the roller cage shown in Figs. 8 and 9, illustrating the manner in which the separate end ring is secured to the body portion of the cage.

In producing each of the forms of roller cages shown and described, the body portion of such cage consisting of the end ring 8, 8′ or 8″ and the bridges 10, 10′ or 10″, extending longitudinally from such end ring, is first made in cylinddical form, as by casting the same in one piece of suitable metal, preferably bronze. The body portion of the cage shown in Figs. 3 and 4 is illustrated in this cylindrical form in full lines in Fig. 15. This cylindrical body portion is then expanded or pressed to the desired tapered or conical shape, after which it is properly finished and machined. The rollers are then inserted in the sockets and the end ring secured to the free ends of the bridges. For expanding or pressing the body portion of the cage to conial form I preferably employ the apparatus shown in Figs. 15 and 16, which is similar to a punch press and comprises the stationary die member 17 and a reciprocatory conical die member 22 which is coaxial with a cylindrical opening 20 through the die member 17. The die member 17 is provided with a conical recess 18 conforming to the desired shape of the finished cage, and at the base of this recess with an annular inclined seat or shoulder 19 conforming to the inclination of the ring or end piece 8 of the finished cage. To expand or press the cylindrical body portion of the cage to conical form, the latter is disposed within the recess 18 as illustrated, and the conical die member 22 is then moved downwardly with respect to the die member 17 within the body portion of the cage and thereupon acts to expand or press the body portion of the cage firmly against the walls of the recess 18 and the seat 19 to the desired conical shape, as illustrated in dotted lines. The die 22 is then raised and the body portion 4 is removed from the die member 17 and finished by reaming out the roller sockets 11 and machining the end ring 8. During the expanding of the cylindrical body portion of the cage to conical form, as described, the bridges 10 are maintained properly spaced and aligned as by being held against relative displacement towards or away from each other. This is preferably accomplished by means of longitudinal ribs or projections 21 formed on the die member 17 and extending inwardly from the surface of the conical recess 18 thereof, which during the expanding of the body portion of the cage, respectively engage closely between the bridges 10. The reciprocatory die member 22 may also be and preferably is provided with a series of similar ribs or projections 23 extending outwardly therefrom, which likewise respectively engage between the bridges 10 when the die 22 is forced downwardly within the body portion of the cage to expand the latter. Obviously, when a body portion of a cage of the type shown in Fig. 14 is expanded to the desired conical form, the ribs or projections 17 and 22 on the die members will be spaced to correspond with the spacing of the roller sockets 11″.

It is to be understood that the specific forms of roller bearings, and also the method of producing roller cages for such bearings, and the apparatus for carrying out certain steps of such method, disclosed herein, are subject to many changes and modifications without any departure from the spirit of the invention or the scope of the appended claims.

I claim:—

1. A cage for tapered roller bearings comprising a body portion consisting of a single heavy integral casting and having an annular end piece and spaced bridges extending therefrom providing roller sockets therebetween, the rollers for which the cage is adapted being insertable into said sockets only from the end thereof opposite said annular end piece, said body portion being cast in substantially cylindrical form and expanded to the desired conical shape prior to insertion of the rollers into the sockets by a dieing operation in which the body portion is engaged only by the forming die apparatus.

2. A three-unit tapered roller bearing comprising a cup having an inner conical bearing surface, a bearing cone, and a conical cage comprising a body portion formed of an integral heavy casting disposed between said cup and cone and having spaced bridges providing roller sockets therebetween, and conical rollers disposed in said sockets for engagement with the bearing surfaces of the cup and cone, said rollers being insertable into said sockets only from an end thereof, said cage being expanded from a substantially cylindrical form to the desired conical shape prior to insertion of the rollers into the sockets thereof by a dieing operation in which the cage is engaged only by the forming die apparatus.

This specification signed this 27th day of Dec. 1922.

CHARLES W. CHISHOLM.